United States Patent
Takahashi (10) Patent No.: US 8,997,481 B2
(45) Date of Patent: Apr. 7, 2015

(54) RESERVOIR TANK AND BRAKE SYSTEM USING THE RESERVOIR TANK

(75) Inventor: Toshiyuki Takahashi, Saitama-ken (JP)

(73) Assignee: Bosch Corporation, Tokyo (JP)

(*) Notice: Subject to any disclaimer, the term of this patent is extended or adjusted under 35 U.S.C. 154(b) by 1024 days.

(21) Appl. No.: 13/119,792

(22) PCT Filed: Sep. 16, 2009

(86) PCT No.: PCT/JP2009/066708
§ 371 (c)(1),
(2), (4) Date: Mar. 18, 2011

(87) PCT Pub. No.: WO2010/032868
PCT Pub. Date: Mar. 25, 2010

(65) Prior Publication Data
US 2011/0227405 A1  Sep. 22, 2011

(30) Foreign Application Priority Data

Sep. 18, 2008 (JP) .................................. 2008-239541
Jul. 14, 2009 (JP) .................................. 2009-165310

(51) Int. Cl.
*B60T 11/22* (2006.01)

(52) U.S. Cl.
CPC ...................................... *B60T 11/22* (2013.01)

(58) Field of Classification Search
CPC .......... B60T 11/26; B60T 17/06; B60T 11/22
USPC ............ 60/534, 533, 585; 220/747, 748, 746, 220/563
See application file for complete search history.

(56) References Cited

U.S. PATENT DOCUMENTS

| 4,385,495 A | 5/1983 | Kubota |
| 4,841,107 A * | 6/1989 | Tandler et al. .............. 200/84 C |
| 6,984,000 B2 * | 1/2006 | Fraisse et al. ..................... 303/1 |
| 7,654,410 B2 * | 2/2010 | Prince et al. .................. 220/564 |
| 2002/0005041 A1 * | 1/2002 | Shinohara et al. .............. 60/585 |
| 2006/0017320 A1 * | 1/2006 | Hayashi .......................... 303/85 |
| 2006/0201150 A1 * | 9/2006 | Mueller .......................... 60/533 |

FOREIGN PATENT DOCUMENTS

| DE | 19625340 | 1/1998 |
| EP | 1600348 | 11/2005 |
| FR | 2294891 | 7/1976 |
| FR | 2841610 | 1/2004 |

(Continued)

*Primary Examiner* — Dwayne J White
*Assistant Examiner* — Logan Kraft
(74) *Attorney, Agent, or Firm* — Michael Best & Friedrich LLP (57) ABSTRACT

In a reservoir tank (5) of the present invention, a hydraulic fluid movement deterring wall (26) is disposed integrally with an upper half body (9) and extending toward a radial direction center of a cylindrical upper half body neck section (24) on a curved portion at a boundary between an inner peripheral surface (24a) of the cylindrical upper half body neck section (24) and an inner surface ($25a_1$) of a ceiling portion (25a) of an upper half body trunk section (25) or on the inner peripheral surface (24a) of the upper half body neck section (24). The movement of the hydraulic fluid frontward (toward a hydraulic fluid inlet (10)) in a hydraulic fluid storage chamber 13 at a time when the reservoir tank (5) is tilted frontward is controlled by this hydraulic fluid movement deterring wall (26).

11 Claims, 7 Drawing Sheets (56) References Cited

FOREIGN PATENT DOCUMENTS

| JP | 5671659 A | 6/1981 |
| JP | 5966729 U | 5/1984 |
| JP | 61-50062 | 4/1986 |
| JP | 6150061 U | 4/1986 |
| JP | 6150062 U | 4/1986 |
| JP | 7315203 A | 12/1995 |
| JP | 2004276773 A | 10/2004 |

* cited by examiner

RESERVOIR TANK AND BRAKE SYSTEM USING THE RESERVOIR TANK

BACKGROUND ART

The present invention relates to the technical field of a reservoir tank that is used in hydraulic brake systems and hydraulic clutch systems utilizing hydraulic pressure such as oil pressure and stores a hydraulic fluid and to the technical field of a brake system using the reservoir tank.

Conventionally, among vehicles such as automobiles, there are vehicles that employ hydraulic brake systems and hydraulic clutch systems utilizing hydraulic pressure. A master cylinder that generates hydraulic pressure and a reservoir tank that stores hydraulic fluid supplied to this master cylinder are used in these hydraulic brake systems and hydraulic clutch systems.

In order for the master cylinder to generate hydraulic pressure at times when hydraulic pressure is needed, it is necessary for a predetermined fluid volume of the hydraulic fluid to be stored in the reservoir tank. For this reason, usually a fluid volume detection sensor is disposed in the reservoir tank, and when the fluid volume in the reservoir tank falls below the predetermined fluid volume, this fluid volume detection sensor detects this and causes a fluid volume indicator to indicate this. Because of the indication of this fluid volume indicator, the reservoir tank is replenished with the hydraulic fluid and the fluid volume in the reservoir tank is ensured equal to or greater than the predetermined fluid volume.

Incidentally, when the vehicle tilts excessively, the reservoir tank also tilts excessively, and the hydraulic fluid in the reservoir tank flows (moves) downward. For this reason, the fluid level of the hydraulic fluid ends up fluctuating, and there is the fear that the fluid volume detection sensor will end up malfunctioning.

Therefore, conventionally, in Japanese Utility Model Registration No. 2,532,584, there is known a reservoir tank where, by using a partition plate having a notch portion to divide the reservoir tank into two chambers on a hydraulic fluid inlet side and a hydraulic fluid storage chamber side, fluctuations in the fluid level of the hydraulic fluid in the hydraulic fluid storage chamber are controlled even if the reservoir tank tilts.

However, in the reservoir tank disclosed in Japanese Utility Model Registration No. 2,532,584, the partition plate is formed separately from a lower half body of the reservoir tank, and this partition plate is disposed so as touch an inner peripheral surface of the lower half body. In disposing the partition plate on the inner peripheral surface of the lower half body in this way, it is necessary to form the partition plate in accordance with the shape and dimensions of the inner peripheral surface of the lower half body. For this reason, not only do shape management and dimension management of the partition plate become troublesome, but the fear that the partition plate will undergo positional displacement or dropping with respect to the lower half body is conceivable. In particular, in the reservoir tank disclosed in Japanese Utility Model Registration No. 2,532,584, because the partition plate is disposed on a curved portion between the hydraulic fluid inlet side and the hydraulic fluid storage chamber side, not only do shape management and dimension management of the partition plate become troublesome, but the fear that the partition plate will undergo positional displacement or dropping even more with respect to the lower half body is conceivable. Consequently, there are the problems that the number of parts increases, the configuration becomes complicated, and the number of assembly man-hours increases.

DISCLOSURE OF THE INVENTION

It is an object of the present invention to provide a reservoir tank which with a simpler configuration can effectively control the movement of hydraulic fluid at a time when the reservoir tank is tilted and a brake system using the reservoir tank.

In order to achieve this object, a reservoir tank of the present invention is a reservoir tank that is formed by welding together an upper half body and a lower half body and stores hydraulic fluid inside, wherein the upper half body has at least a tubular neck section having a hydraulic fluid inlet and a trunk section disposed integrally on this neck section, and a hydraulic fluid movement deterring wall that controls the movement of the hydraulic fluid toward the hydraulic fluid inlet at a time when the reservoir tank is tilted is molded integrally with the upper half body on an inner peripheral surface of the neck section or on a boundary portion between the inner peripheral surface of the neck section and an inner surface of the trunk section.

Further, in the reservoir tank of the present invention, the hydraulic fluid movement deterring wall is disposed extending toward a center of the tubular neck section.

Moreover, in the reservoir tank of the present invention, the hydraulic fluid flow area of a transverse section, orthogonal to an axial direction of the neck section, of the portion of the neck section where the hydraulic fluid movement deterring wall is disposed is set smaller than the hydraulic fluid flow area of a transverse section, orthogonal to the axial direction of the neck section, of the portion of the neck section where the hydraulic fluid movement deterring wall is not disposed.

Moreover, in the reservoir tank of the present invention, the hydraulic fluid movement deterring wall is disposed extending toward a vehicle front side in a state where the reservoir tank is attached to a vehicle body.

Moreover, in the reservoir tank of the present invention, an undersurface of the hydraulic fluid movement deterring wall has a gradient inclined so as to become lower toward a vehicle rear side in a state where the reservoir tank is attached to a vehicle body.

Moreover, a reservoir tank of the present invention is a reservoir tank that is formed by welding together an upper half body and a lower half body and stores hydraulic fluid inside, wherein the upper half body has at least a tubular neck section having a hydraulic fluid inlet and a trunk section disposed integrally on this neck section, and a hydraulic fluid movement controlling passageway that controls the movement of the hydraulic fluid toward the hydraulic fluid inlet at a time when the reservoir tank is tilted is molded integrally with the upper half body in the trunk section.

Moreover, in the reservoir tank of the present invention, a hydraulic fluid movement deterring portion is molded integrally with the upper half body on a corner portion between a bottom surface of the hydraulic fluid movement controlling passageway and an inner peripheral surface of the neck section.

Moreover, the reservoir tank of the present invention further comprises a fluid volume detecting component that detects the fluid volume of the hydraulic fluid inside, wherein the fluid volume detecting component has at least a dividing wall that demarcates a float chamber inside and has an interstitial passageway that allows the float chamber to be communicated with the outside and a float that is disposed in the float chamber and moves in response to the fluid level of the hydraulic fluid in the float chamber, and a hydraulic fluid interstitial passageway movement deterring portion that controls the movement of the hydraulic fluid through the interstitial passageway is disposed so as to cover the interstitial passageway.

Moreover, a brake system of the present invention comprises at least: a reservoir tank that stores hydraulic fluid; a master cylinder to which the hydraulic fluid in the reservoir tank is supplied and which generates brake pressure at a time when the master cylinder is actuated; and a brake cylinder that is actuated by hydraulic pressure from the master cylinder, wherein the reservoir tank is any one of the reservoir tanks of the present invention described above.

According to the reservoir tank of the present invention configured in this way, the hydraulic fluid movement deterring wall is extendingly disposed integrally with the upper half body on the boundary portion between the inner peripheral surface of the tubular neck section and the inner surface of the trunk section or on the inner peripheral surface of the neck section. Consequently, the movement of the hydraulic fluid in the reservoir tank in the direction of the hydraulic fluid inlet can be controlled by this hydraulic fluid movement deterring wall.

In particular, because the hydraulic fluid movement deterring wall is disposed integrally with the upper half body and extending toward a radial direction center of the tubular neck section, the movement of the hydraulic fluid in the tubular neck section at a time when the reservoir tank is tilted can be more effectively controlled.

Further, because the hydraulic fluid flow area of the transverse section, orthogonal to the axial direction of the neck section, of the portion of the neck section where the hydraulic fluid movement deterring wall is disposed is made smaller than the hydraulic fluid flow area of the transverse section, orthogonal to the axial direction of the neck section, of the other portion of the upper half body neck section, the flow of the hydraulic fluid at the portion where the hydraulic fluid movement deterring wall is disposed is controlled. Thus, the movement of the hydraulic fluid in the direction of the hydraulic fluid inlet at a time when the reservoir tank is tilted frontward can be controlled even more.

Moreover, because the hydraulic fluid movement deterring wall is molded integrally with the upper half body, shape management and dimension management of the hydraulic fluid movement deterring wall can be done without having to be performed that precisely, and positional displacement and dropping with respect to the upper half body do not occur. Moreover, an increase in the number of parts can be inhibited, the configuration of the reservoir tank can be made simple, and an increase in the number of man-hours required to assemble the reservoir tank can also be inhibited.

Moreover, because the hydraulic fluid movement deterring wall is disposed extending toward the vehicle front side in a state where the reservoir tank is attached to the vehicle body, the frontward movement of the hydraulic fluid in the reservoir tank at a time when the reservoir tank is tilted frontward can be more effectively controlled. In particular, because the undersurface of the hydraulic fluid movement deterring wall has a gradient inclined so as to become lower toward the vehicle rear side, air bleeding becomes easy at the time when the hydraulic fluid is supplied to the reservoir tank. In this way, air bleeding at the time when the reservoir tank is replenished with the hydraulic fluid can be made easy, and the frontward movement of the hydraulic fluid at a time when the reservoir tank is tilted frontward can be more effectively controlled.

Moreover, the hydraulic fluid movement controlling passageway that controls the movement of the hydraulic fluid toward the hydraulic fluid inlet at a time when the reservoir tank is tilted is molded integrally with the upper half body in the trunk section of the upper half body. The movement of the hydraulic fluid frontward in the hydraulic fluid storage chamber at a time when the reservoir tank is tilted frontward can be controlled by this hydraulic fluid movement controlling passageway. Moreover, the hydraulic fluid movement deterring portion is molded integrally with the upper half body on the corner portion between the bottom surface of the hydraulic fluid movement controlling passageway and the inner peripheral surface of the neck section. The movement of the hydraulic fluid frontward (toward the hydraulic fluid inlet) in the hydraulic fluid storage chamber at a time when the reservoir tank is tilted frontward can be controlled by this hydraulic fluid movement deterring portion.

Moreover, the hydraulic fluid interstitial passageway movement deterring portion is disposed so as to cover the interstitial passageway, which is disposed in the dividing wall demarcating the float chamber of the fluid volume detecting component and allows the float chamber and the outside to be communicated with each other. The flow of the hydraulic fluid in the float chamber to the outside of the dividing wall and movement in a left-right direction at a time when the reservoir tank is tilted in the left-right direction can be controlled by this hydraulic fluid interstitial passageway movement deterring portion.

As described above, according to the reservoir tank of the present invention, erroneous lighting such as a warning resulting from a malfunction of the fluid volume detecting component can be more effectively prevented because the amount of movement of the hydraulic fluid in the reservoir can be controlled at at least one of a time when the reservoir tank is tilted frontward and a time when the reservoir tank is tilted in the left-right direction.

Furthermore, according to the brake system using the reservoir tank of the present invention, brake actuation can be more reliably performed because the movement of the hydraulic fluid in the reservoir tank at a time when the vehicle tilts can be controlled.

BEST MODES FOR CARRYING OUT THE INVENTION

Modes for carrying out the present invention will be described below using the drawings.

Figure 1:
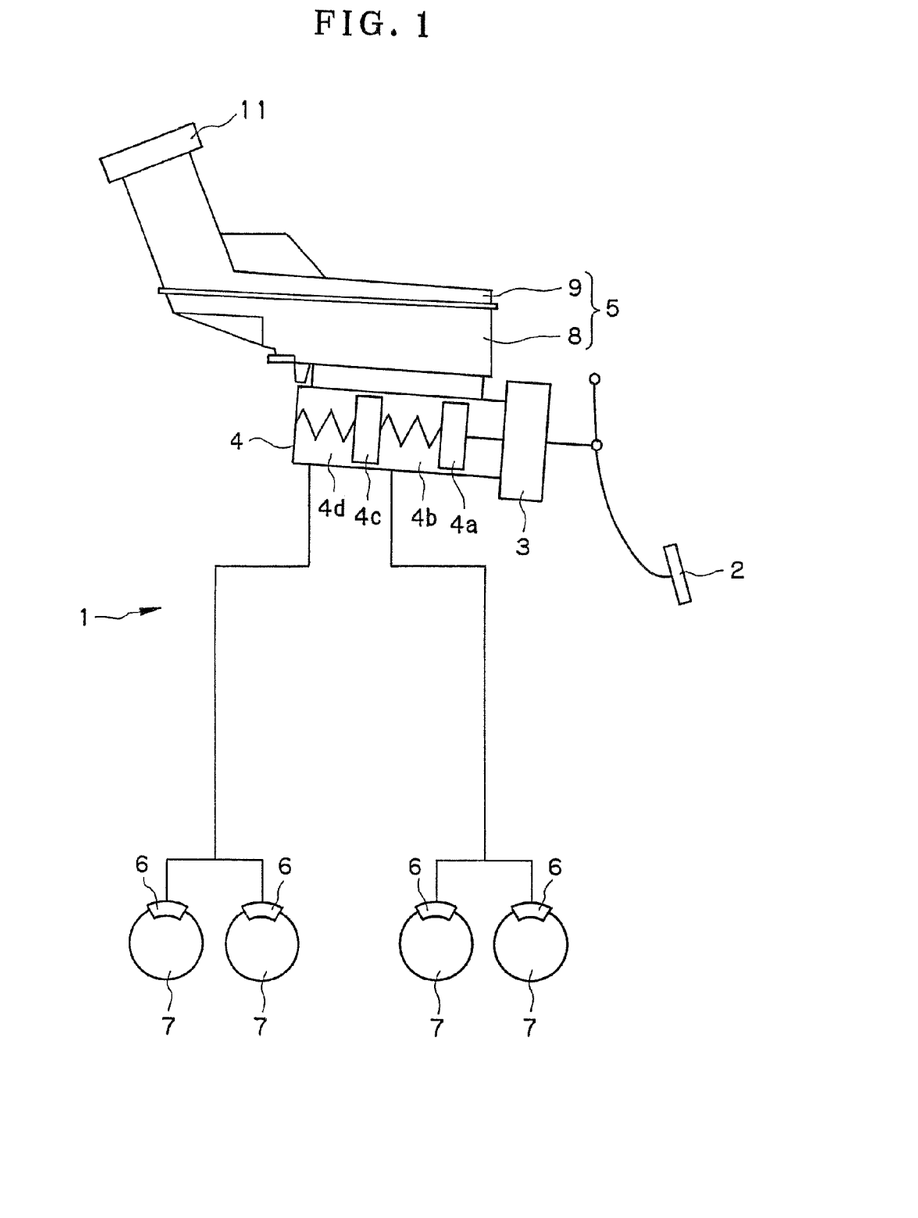
FIG. 1 is a diagram schematically showing a brake system equipped with one example of an embodiment of a reservoir tank pertaining to the present invention.

FIG. 1 is a diagram schematically showing a brake system equipped with one example of an embodiment of a reservoir tank pertaining to the present invention.

As shown in FIG. 1, a hydraulic brake system 1 of this example is basically the same as a conventionally publicly-known common dual hydraulic brake system. That is, the hydraulic brake system 1 is equipped with a brake pedal 2, a booster 3, a tandem master cylinder 4, a reservoir tank 5, and brake cylinders 6. The reservoir tank 5 is attached to the tandem master cylinder 4, which is fixed to a vehicle body. In that case, the reservoir tank 5 is attached such that its lengthwise direction coincides with the front-rear direction of the vehicle or substantially coincides with the vehicle front-rear direction.

Additionally, when a driver steps on the brake pedal 2, the booster 3 is actuated, boosts the pedal force by a predetermined servo ratio, and outputs the boosted pedal force. A primary piston 4a of the tandem master cylinder 4 is actuated by the output of this booster 3 to supply hydraulic fluid in a primary hydraulic fluid chamber 4b to the brake cylinders 6 of one line and a secondary piston 4c is actuated by the output of this booster 3 to supply hydraulic fluid in a secondary hydraulic fluid chamber 4d to the brake cylinders 6 of the other line. When the loss stroke of each brake line ceases, the tandem master cylinder 4 generates hydraulic pressure. This hydraulic pressure of the tandem master cylinder 4 is transmitted to each brake cylinder 6, each brake cylinder 6 generates a braking force, and brakes are applied to each wheel 7.

Figure 2:
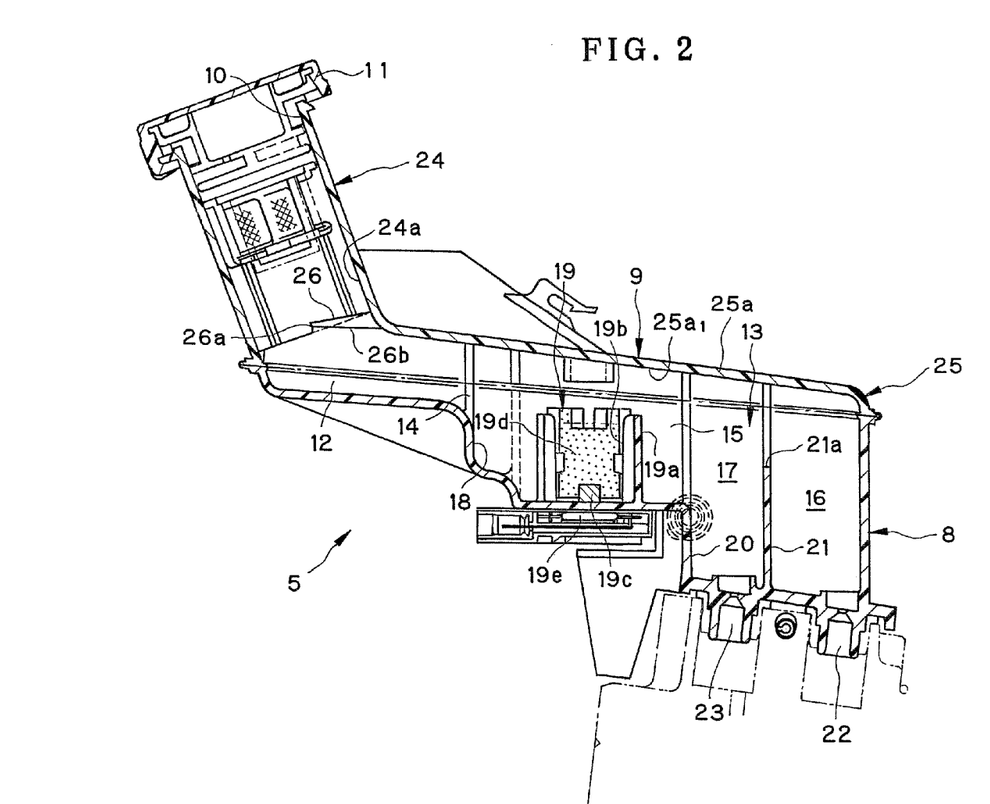
FIG. 2 is a longitudinal sectional view in a lengthwise direction showing the one example of the embodiment of the reservoir tank pertaining to the present invention.

FIG. 2 is a longitudinal sectional view in the lengthwise direction of the reservoir tank of this example. In the description below, high/low of heights of bottoms of sites refers to high/low in a state where the reservoir tank is attached to the vehicle body and the vehicle is made horizontal.

As shown in FIG. 2, the reservoir tank 5 used in the brake system 1 of this example has a container-like lower half body 8, which stores the hydraulic fluid supplied to the tandem master cylinder 4 and opens upward, and an upper half body 9, which is welded to this lower half body 8 and blocks the open portion in the upper end of the lower half body 8. A hydraulic fluid inlet 10 and a cap 11 that opens and closes this hydraulic fluid inlet 10 are disposed in the upper half body 9.

The lower half body 8 of this example has a hydraulic fluid supply portion 12, a hydraulic fluid storage chamber 13, and a hydraulic fluid passageway 14 disposed between the hydraulic fluid supply portion 12 and the hydraulic fluid storage chamber 13. The hydraulic fluid is supplied to the hydraulic fluid supply portion 12 through the hydraulic fluid inlet 10 in the upper half body 9.

The hydraulic fluid storage chamber 13 has a fluid volume detection chamber 15, a primary hydraulic fluid storage chamber 16, and a secondary hydraulic fluid storage chamber 17. Additionally, in a state where the reservoir tank 5 is attached to the vehicle body via the tandem master cylinder 4, the hydraulic fluid inlet 10, the hydraulic fluid supply portion 12, the fluid volume detection chamber 15, the secondary hydraulic fluid storage chamber 17, and the primary hydraulic fluid storage chamber 16 are disposed in this order from the vehicle front side (the left side in FIG. 2) toward the vehicle rear side (the right side in FIG. 2).

The bottom surface of the hydraulic fluid supply portion 12 has a gradient inclined so as to become lower from the vehicle front side toward the vehicle rear side (that is, from the hydraulic fluid inlet 10 side toward the fluid volume detection chamber 15 side). Further, a step 18 is disposed at the boundary portion between the hydraulic fluid supply portion 12 and the fluid volume detection chamber 15, and the entire bottom surface of the hydraulic fluid supply portion 12 is higher than the bottom surface of the fluid volume detection chamber 15. The bottom surface of the fluid volume detection chamber 15 is formed horizontally. Additionally, the hydraulic fluid supply portion 12 and the fluid volume detection chamber 15 are always communicated with each other.

A fluid volume detecting component 19 is disposed in the fluid volume detection chamber 15. This fluid volume detecting component 19 is disposed in the substantial center in the front-rear direction of the lower half body 8 and detects the fluid volume of the hydraulic fluid stored in the reservoir tank 5. The fluid volume detecting component 19 is equipped with a float 19d, which is disposed in a float chamber 19b enclosed by a cylindrical dividing wall 19a and has a magnet 19c, and a lead switch 19e, which is disposed directly under the fluid volume detecting component 19 and is actuated by the magnet 19c. The float chamber 19b is always communicated by an unillustrated small interstitial passageway (a notch or a slit) with the fluid volume detection chamber 15 on the outer periphery of the cylindrical dividing wall 19a, and the hydraulic fluid also enters the float chamber 19b. In that case, the height of the fluid level of the hydraulic fluid in the float chamber 19b and the height of the fluid level of the hydraulic fluid in the fluid volume detection chamber 15 are always the same in a normal state where the reservoir tank 5 is attached to the vehicle body.

Additionally, the float 19d moves up and down in the float chamber 19b in response to the height of the fluid level of the hydraulic fluid in the float chamber 19b, and when the hydraulic fluid in the fluid volume detection chamber 15 decreases and the height of the fluid level of the hydraulic fluid reaches a prescribed minimum MIN position (not shown), the float 19d also reaches a bottommost height position corresponding to this height of the fluid level. The magnet 19c actuates the lead switch 19e at the height position of the float 19d at this time, and a warning lamp lights up.

A step 20 is disposed at the boundary portion between the fluid volume detection chamber 15 and the secondary hydraulic fluid storage chamber 17, and the bottom surface of the fluid volume detection chamber 15 is higher than the entire bottom surface of the secondary hydraulic fluid storage chamber 17. The bottom surface of this secondary hydraulic fluid storage chamber 17 has a gradient inclined so as to become lower from the vehicle front side toward the vehicle rear side (that is, from the fluid volume detection chamber 15 side toward the primary hydraulic fluid storage chamber 16 side). Additionally, the fluid volume detection chamber 15 and the secondary hydraulic fluid storage chamber 17 are always communicated with each other.

A dividing wall 21 is disposed at the boundary portion between the secondary hydraulic fluid storage chamber 17 and the primary hydraulic fluid storage chamber 16. The primary hydraulic fluid storage chamber 16 and the secondary hydraulic fluid storage chamber 17 are partitioned by this dividing wall 21. The height of an upper end 21a of the dividing wall 21 is set lower than the height corresponding to the MIN position that is the minimum fluid volume of the hydraulic fluid in the reservoir tank 5. Consequently, the primary hydraulic fluid storage chamber 16 and the secondary hydraulic fluid storage chamber 17 are always communicated with each other at their upper sides, and at a time when the hydraulic fluid is contained at a fluid volume at or higher than the MIN position in the reservoir tank 5, the fluid level of the hydraulic fluid in the primary hydraulic fluid storage chamber 16 and the fluid level of the hydraulic fluid in the secondary hydraulic fluid storage chamber 17 both reach a position higher than the upper end 21a of the dividing wall 21 and form a common fluid level.

The bottom surface of the primary hydraulic fluid storage chamber 16 also has a gradient inclined so as to become lower from the vehicle front side toward the vehicle rear side (that is, from the secondary hydraulic fluid storage chamber 17 side toward the rear end wall side of the reservoir tank). In that case, the inclined surface of the bottom surface of the secondary hydraulic fluid storage chamber 17 and the inclined surface of the bottom surface of the primary hydraulic fluid storage chamber 16 are configured as an identical inclined surface. Consequently, the entire bottom surface of the primary hydraulic fluid storage chamber 16 is lower than the bottom surface of the secondary hydraulic fluid storage chamber 17.

A primary hydraulic fluid supply port 22 and a secondary hydraulic fluid supply port 23 are disposed in the bottom surfaces of the primary hydraulic fluid storage chamber 16 and the secondary hydraulic fluid storage chamber 17, respectively. The primary hydraulic fluid supply port 22 is connected to the primary hydraulic fluid chamber 4b of the tandem master cylinder 4, and the secondary hydraulic fluid supply port 23 is connected to the secondary hydraulic fluid chamber 4d of the tandem master cylinder 4.

The upper half body 9 has a cylindrical upper half body neck section 24, which configures the hydraulic fluid inlet 10, and a box-like upper half body trunk section 25, which is fixed to the upper surface of the lower half body 8. The upper half body neck section 24 is disposed on the front end portion (the left end portion in FIG. 2) of the upper half body trunk section 25. In that case, this upper half body neck section 24 is disposed extending diagonally frontward and upward from the front end portion of the upper half body trunk section 25. A ceiling portion 25a of the upper half body trunk section 25 has a gradient inclined so as to become lower from the vehicle front side toward the vehicle rear side (that is, from the upper half body neck section 24 side toward the rear end side of the upper half body 9). Consequently, an inner surface $25a_1$ of the ceiling portion 25a of the upper half body trunk section 25 has the same gradient. Thus, at the time when the hydraulic fluid has been supplied as far as a maximum MAX value to the reservoir tank 5, the air in the reservoir tank 5 moves toward the hydraulic fluid inlet 10, and the air does not remain in the hydraulic fluid in the reservoir tank 5.

A hydraulic fluid movement deterring wall 26 that controls the movement of the hydraulic fluid toward the hydraulic fluid inlet 10 at a time when the reservoir tank 5 is tilted excessively toward the vehicle front side is disposed on a curved portion at the boundary between an inner peripheral surface 24a of the upper half body neck section 24 and the inner surface $25a_1$ of the ceiling portion 25a of the upper half body trunk section 25. This hydraulic fluid movement deterring wall 26 has a triangular longitudinal sectional shape. Further, a distal end 26a of the hydraulic fluid movement deterring wall 26 is disposed extending as far as the substantial center of the inside of the upper half body neck section 24. That is, the hydraulic fluid movement deterring wall 26 is disposed extending toward the vehicle front side in a state where the reservoir tank 5 is attached to the vehicle body. Consequently, the hydraulic fluid flow area of the transverse section, orthogonal to the axial direction of the upper half body neck section 24, of the portion of the upper half body neck section 24 where the hydraulic fluid movement deterring wall 26 is disposed is smaller than the hydraulic fluid flow area of the transverse section, orthogonal to the axial direction of the upper half body neck section 24, of the other portion of the upper half body neck section 24.

The position of the distal end 26a of the hydraulic fluid movement deterring wall 26 is not limited to being in the center of the upper half body neck section 24 and can be arbitrarily set. Further, the hydraulic fluid movement deterring wall 26 can be formed in various shapes, such as a rectangular shape, a fan shape or a substantial fan shape, or a shape comprising a semicircular shape or a circular arc and a chord, when seen in a plan view. Further, the hydraulic fluid movement deterring wall 26 can also be disposed on the inner peripheral surface 24a of the upper half body neck section 24.

An undersurface 26b of the hydraulic fluid movement deterring wall 26 has a gradient with an angle of inclination (an angle with respect to a horizontal plane) that is identical to that of the inner surface $25a_1$ of the ceiling portion 25a of the upper half body trunk section 25. Consequently, the undersurface 26b of the hydraulic fluid movement deterring wall 26 and the inner surface $25a_1$ of the ceiling portion 25a are configured as a substantially identical inclined surface. The undersurface 26b of the hydraulic fluid movement deterring wall 26 and the inner surface $25a_1$ of the ceiling portion 25a can also be configured as different inclined surfaces having identical angles of inclination. In that case, the position of the undersurface 26b at the base of the hydraulic fluid movement deterring wall 26 is set higher than the position of the inner surface $25a_1$ at the front end (the left end in FIG. 2) of the ceiling portion 25a. Moreover, the angle of inclination of the undersurface 26b of the hydraulic fluid movement deterring wall 26 can also be set different from the angle of inclination of the inner surface $25a_1$ of the ceiling portion 25a. In that case, it is necessary for the angle of inclination of the undersurface 26b of the hydraulic fluid movement deterring wall 26 to be set to an angle greater than a horizontal plane in a horizontal state of the vehicle at a time when the reservoir tank 5 is attached to the vehicle body so that air does not become mixed in with the hydraulic fluid stored in the reservoir tank 5. It is desirable for the angle of inclination of the undersurface 26b of the hydraulic fluid movement deterring wall 26 to be set equal to or greater than the angle of inclination of the inner surface $25a_1$ of the ceiling portion 25a. In particular, it is desirable for the undersurface 26b of the hydraulic fluid movement deterring wall 26 to be disposed on an extension plane of the inner surface $25a_1$ of the ceiling portion 25a.

This hydraulic fluid movement deterring wall 26 is molded integrally with the upper half body neck section 24 and the upper half body trunk section 25 by resin.

Figure 3:
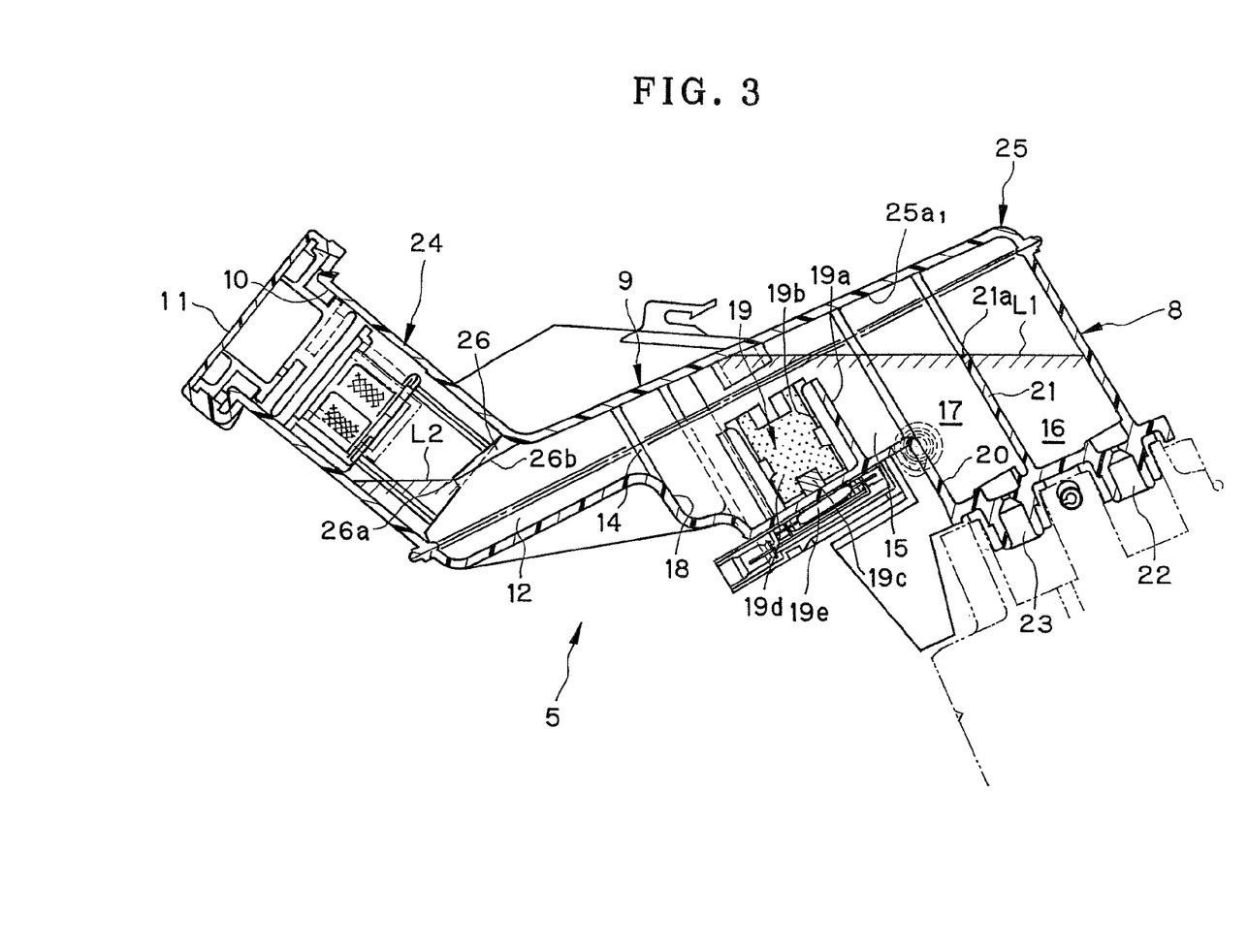
FIG. 3 is a longitudinal sectional view that is the same as FIG. 2 and describes control of the movement of hydraulic fluid at a time when the reservoir tank of the example shown in FIG. 2 is tilted.

In the reservoir tank 5 of this example configured in this way, it is assumed that the fluid level of the hydraulic fluid stored in the reservoir tank 5 is in a position lower than the undersurface 26b of the hydraulic fluid movement deterring wall 26 and higher than the MIN position in a state where the vehicle is horizontal at a time when the reservoir tank 5 is attached to the vehicle body, for example. When the reservoir tank 5 is tilted frontward in this state, the fluid level of the hydraulic fluid in the reservoir tank 5 reaches the position shown in FIG. 3. That is, a fluid level $L_1$ of the hydraulic fluid in the hydraulic fluid storage chamber 13 becomes substantially a level plane defined by the upper end 21a of the dividing wall 21. Further, a fluid level $L_2$ of the hydraulic fluid on the hydraulic fluid supply portion 12 side becomes substantially a level plane defined by the distal end 26a of the hydraulic fluid movement deterring wall 26.

Figure 4:
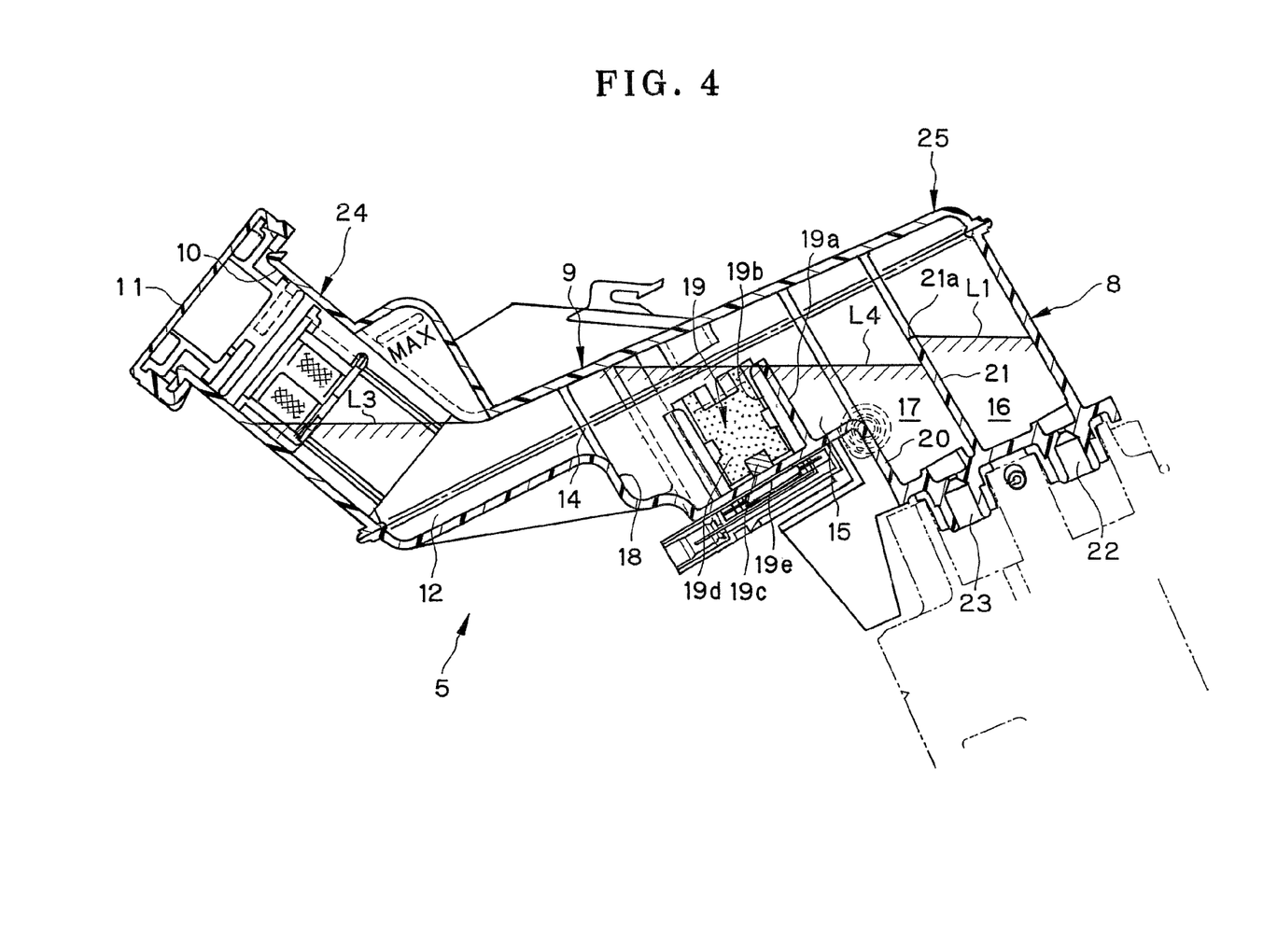
FIG. 4 is a longitudinal sectional view that is the same as FIG. 2 and describes control of the movement of the hydraulic fluid at a time when the reservoir tank of the example shown in FIG. 2 is tilted in a case where a hydraulic fluid movement deterring wall is not disposed.

For example, in a reservoir tank 5 where the hydraulic fluid movement deterring wall 26 is not disposed and all other configurations are the same as those in the example shown in FIG. 2, the fluid level of the hydraulic fluid in the reservoir tank 5 reaches the position shown in FIG. 4. That is, the fluid level $L_1$ of the hydraulic fluid in the primary hydraulic fluid storage chamber 16 becomes, like in the case where the hydraulic fluid movement deterring wall 26 is disposed, substantially a level plane defined by the upper end 21a of the dividing wall 21. Further, a fluid level $L_3$ of the hydraulic fluid on the hydraulic fluid supply portion 12 side becomes substantially a level plane defined by the curved portion (the portion corresponding to the position of the base of the hydraulic fluid movement deterring wall 26) at the boundary between the upper half body neck section 24 and the upper half body trunk section 25. That is, this fluid level $L_3$ becomes higher than the fluid level $L_2$ in the case where the hydraulic fluid movement deterring wall 26 is disposed.

Consequently, the amount of movement of the hydraulic fluid frontward (that is, toward the upper half body neck section 24) in the reservoir tank 5 at a time when the reservoir tank 5 is tilted toward the vehicle front side (that is, at a time when the reservoir tank 5 is tilted in the direction of the hydraulic fluid inlet 10) is large . The portion by which this amount of frontward movement increases is the hydraulic fluid in the fluid volume detection chamber 15 and the primary hydraulic fluid storage chamber 16. In a case where the hydraulic fluid movement deterring wall 26 is not disposed in this way, a fluid level $L_4$ of the hydraulic fluid in the fluid volume detection chamber 15 and the primary hydraulic fluid storage chamber 16 becomes lower than the fluid level $L_1$ of the hydraulic fluid in the primary hydraulic fluid storage chamber 16 because the amount of frontward movement of the hydraulic fluid in the fluid volume detection chamber 15 and the primary hydraulic fluid storage chamber 16 becomes larger.

As described above, in the reservoir tank 5 of this example, the movement of the hydraulic fluid in the reservoir tank 5 frontward (that is, toward the hydraulic fluid inlet 10 in the upper half body neck section 24) is controlled by the hydraulic fluid movement deterring wall 26 at a time when the reservoir tank 5 is tilted toward the vehicle front side. That is, the amount of frontward movement of the hydraulic fluid in the reservoir tank 5 at a time when the reservoir tank 5 is tilted toward the vehicle front side is controlled.

According to the reservoir tank 5 of this example, the hydraulic fluid movement deterring wall 26 is disposed integrally with the upper half body 9 and extending toward the radial direction center of the cylindrical upper half body neck section 24 on the curved portion at the boundary between the inner peripheral surface 24a of the cylindrical upper half body neck section 24 and the inner surface $25a_1$ of the ceiling portion 25a of the upper half body trunk section 25 or on the inner peripheral surface 24a of the upper half body neck section 24. Consequently, the movement of the hydraulic fluid frontward (toward the hydraulic fluid inlet 10) in the hydraulic fluid storage chamber at a time when the reservoir tank 5 is tilted toward the vehicle front side can be controlled by the hydraulic fluid movement deterring wall 26.

In particular, because the hydraulic fluid flow area of the transverse section, orthogonal to the axial direction of the upper half body neck section 24, of the portion of the upper half body neck section 24 where the hydraulic fluid movement deterring wall 26 is disposed is made smaller than the hydraulic fluid flow area of the transverse section, orthogonal to the axial direction of the upper half body neck section 24, of the other portion of the upper half body neck section 24, the flow of the hydraulic fluid at the portion where the hydraulic fluid movement deterring wall 26 is disposed is controlled. Thus, the movement of the hydraulic fluid frontward (toward the hydraulic fluid inlet 10) in the hydraulic fluid storage chamber at a time when the reservoir tank 5 is tilted toward the vehicle front side can be controlled even more.

Further, because the hydraulic fluid movement deterring wall 26 is molded integrally with the upper half body 9, shape management and dimension management of the hydraulic fluid movement deterring wall 26 can be done without having to be performed that precisely, and positional displacement and dropping with respect to the upper half body 9 do not occur. Moreover, an increase in the number of parts can be inhibited, the configuration of the reservoir tank 5 can be made simple, and an increase in the number of man-hours required to assemble the reservoir tank 5 can also be inhibited.

Moreover, because the hydraulic fluid movement deterring wall 26 is disposed extending toward the vehicle front side in a state where the reservoir tank 5 is attached to the vehicle body, the frontward movement of the hydraulic fluid in the reservoir tank 5 at a time when the reservoir tank 5 is tilted toward the vehicle front side can be more effectively controlled. In particular, because the undersurface 26b of the hydraulic fluid movement deterring wall 26 has a gradient inclined so as to become lower toward the vehicle rear side, air bleeding becomes easy at the time when the hydraulic fluid is supplied to the reservoir tank 5. In that case, because the undersurface $25a_1$ of the ceiling portion 25a of the upper half body trunk section 25 of the reservoir tank 5 has a gradient inclined so as to become lower toward the vehicle rear side, and by configuring the undersurface 26b of the hydraulic fluid movement deterring wall 26 as an inclined surface that is identical to or substantially identical to the undersurface $25a_1$ of this ceiling portion 25a, this hydraulic fluid air bleeding can be performed even more easily. In this way, air bleeding at the time when the reservoir tank 5 is replenished with the hydraulic fluid can be made easy, and the frontward movement of the hydraulic fluid at a time when the reservoir tank 5 is tilted toward the vehicle front side can be more effectively controlled.

As described above, erroneous lighting such as a warning resulting from a malfunction of the fluid volume detecting component 19 can be more effectively prevented because the amount of movement of the hydraulic fluid in the reservoir 5 at a time when the reservoir tank 5 is tilted toward the vehicle front side can be controlled.

Furthermore, according to the hydraulic brake system 1 using the reservoir tank 5 of each example described above, brake actuation can be more reliably performed because the movement of the hydraulic fluid in the reservoir tank 5 at a time when the vehicle tilts frontward can be controlled.

Figures 5A, 5B, 5C:
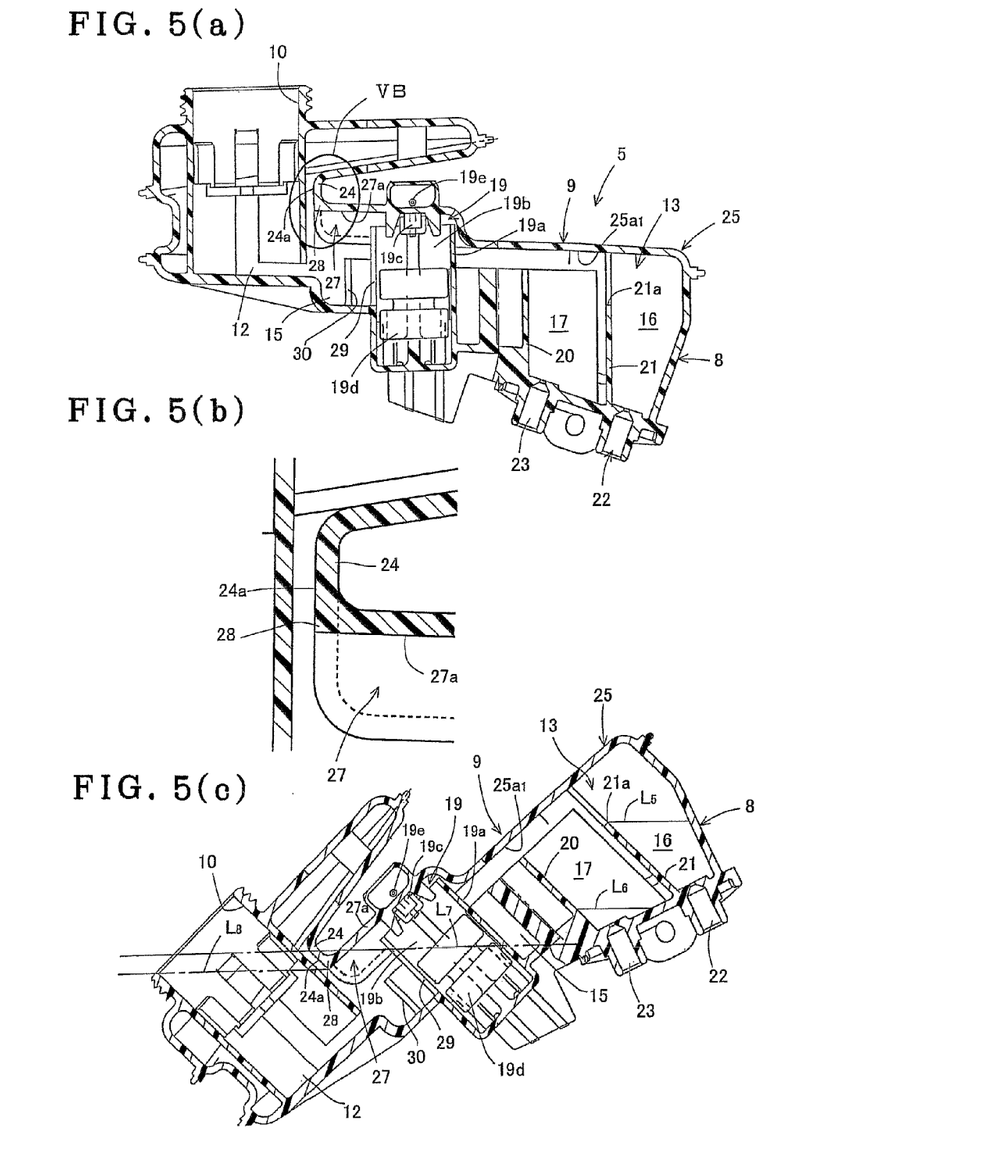
FIG. 5(a) is a longitudinal sectional view in a lengthwise direction that is the same as FIG. 2 and shows another example of the embodiment of the reservoir tank pertaining to the present invention.
FIG. 5(b) is a partially enlarged sectional view of portion VB in FIG. 5(a)
FIG. 5(c) is a longitudinal sectional view that is the same as FIG. 5(a) and describes control of the movement of the hydraulic fluid at a time when the reservoir tank of the example shown in FIG. 5(a) is tilted.

FIG. 5(*a*) is a longitudinal sectional view in a lengthwise direction that is the same as FIG. 2 and shows another example of the embodiment of the reservoir tank pertaining to the present invention, FIG. 5(*b*) is a partially enlarged sectional view of portion VB in FIG. 5(*a*), and FIG. 5(*c*) is a longitudinal sectional view that is the same as FIG. 5(*a*) and describes control of the movement of the hydraulic fluid at a time when the reservoir tank of the example shown in FIG. 5(a) is tilted toward the vehicle front side.

Figure 6A:
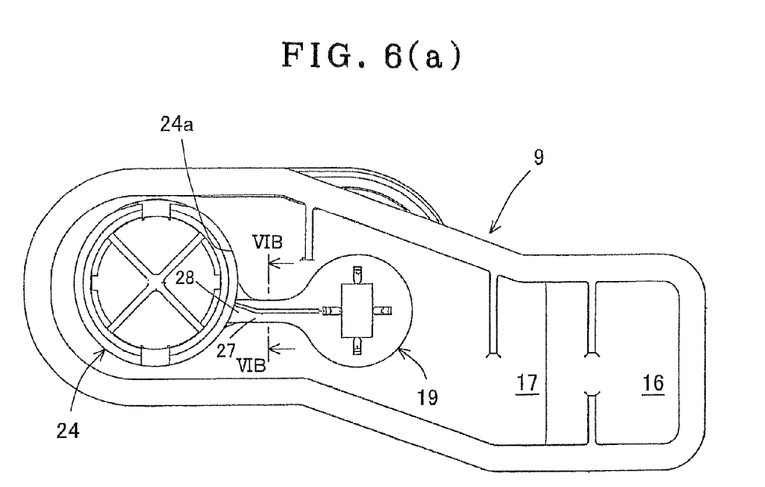
FIG. 6(a) is a view in which an upper half body of the reservoir tank of the example shown in FIG. 5(a) is seen from below.
Figure 6B:
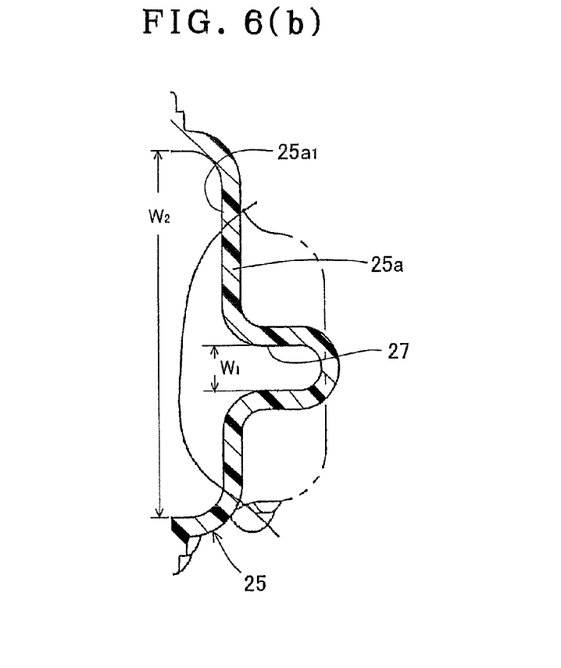
FIG. 6(b) is a partial sectional view along line VIB-VIB in FIG. 6(a).

In the example described above, the inner surface $25a_1$ of the ceiling portion 25a of the upper half body trunk section 25 is configured as a simple, substantially flat surface that is relatively wide in the direction orthogonal to the lengthwise direction of the reservoir tank 5 in the horizontal direction from the portion opposing the primary hydraulic fluid storage chamber 16 to the inner peripheral surface 24a of the upper half body neck section 24. In contrast, as shown in FIG. 5(a) and FIGS. 6(a) and (b), in the reservoir tank 5 of this example, a fluid passageway 27 extending in the lengthwise direction (the left-right direction in FIG. 5(a)) of the reservoir tank 5 is disposed in the inner surface $25a_1$ of the ceiling portion 25a of the upper half body trunk section 25.

As shown in FIG. 6(b), the fluid passageway 27 is formed by a groove with a substantially U-shaped transverse section recessed upward from the inner surface $25a_1$. In that case, a width $w_1$ of the fluid passageway 27 in the direction orthogonal to the lengthwise direction is configured to be much smaller (narrower) than a width $w_2$ in the same direction of the entire inner surface $25a_1$. The portion of the ceiling portion 25 where this fluid passageway 27 is formed bulges upward from the other portion of the ceiling portion 25. Additionally, the fluid passageway 27 is disposed extending from the portion of the inner surface $25a_1$ that the fluid volume detecting component 19 opposes to the inner peripheral surface 24a of the upper half body neck section 24. Consequently, when the hydraulic fluid in the hydraulic fluid storage chamber touches the inner surface $25a_1$ of the ceiling portion 25a and moves frontward (toward the hydraulic fluid inlet 10) at a time when the reservoir tank 5 is tilted toward the vehicle front side, the flow of the hydraulic fluid frontward is confined by the narrow fluid passageway 27. That is, the movement of the hydraulic fluid frontward (toward the hydraulic fluid inlet 10) in the hydraulic fluid storage chamber at a time when the reservoir tank 5 is tilted toward the vehicle front side is controlled by the fluid passageway 27. In this way, the fluid passageway configures a hydraulic fluid movement controlling passageway that controls the movement of the hydraulic fluid toward the vehicle front side at a time when the reservoir tank 5 is tilted toward the vehicle front side. It suffices for the fluid passageway 27 to be disposed at least on the vehicle front side of the fluid volume detecting component 19. Consequently, the fluid passageway 27 can also be extendingly disposed on the vehicle rear side of the fluid volume detecting component 19.

Moreover, as shown in FIG. 5(b), the corner portion of the inner peripheral surface 24a at a bottom surface 27a of the fluid passageway 27 is not configured as a rounded portion such as indicated by the double-dash chain line but is configured as an edge portion resulting from thickness. In the reservoir tank 5 of this example, a hydraulic fluid movement deterring portion 28 is formed by this edge portion. This hydraulic fluid movement deterring portion 28 functions in substantially the same way as the hydraulic fluid movement deterring wall 26 of the example described above and controls the movement of the hydraulic fluid frontward (toward the hydraulic fluid inlet 10) in the hydraulic fluid storage chamber at a time when the reservoir tank 5 is tilted toward the vehicle front side. That is, as shown in FIG. 5(c), when the reservoir tank 5 is tilted toward the vehicle front side, the fluid level of the hydraulic fluid in the reservoir tank 5 becomes a level fluid level $L_5$ in the primary hydraulic fluid storage chamber 16, becomes a level fluid level $L_6$ lower than the fluid level $L_5$ in the secondary hydraulic fluid storage chamber 17, and becomes a level fluid level $L_7$ lower than the fluid level $L_6$ in the fluid volume detection chamber 15 including the float chamber 19b of the fluid volume detecting component 19. Further, in the upper half body neck section 24, the fluid level is defined by the hydraulic fluid movement deterring portion 28 and becomes a level fluid level $L_8$ lower than the fluid level $L_7$. Consequently, the amount of frontward movement of the hydraulic fluid in the reservoir tank 5 at a time when the reservoir tank 5 is tilted toward the vehicle front side is controlled.

Figure 7:
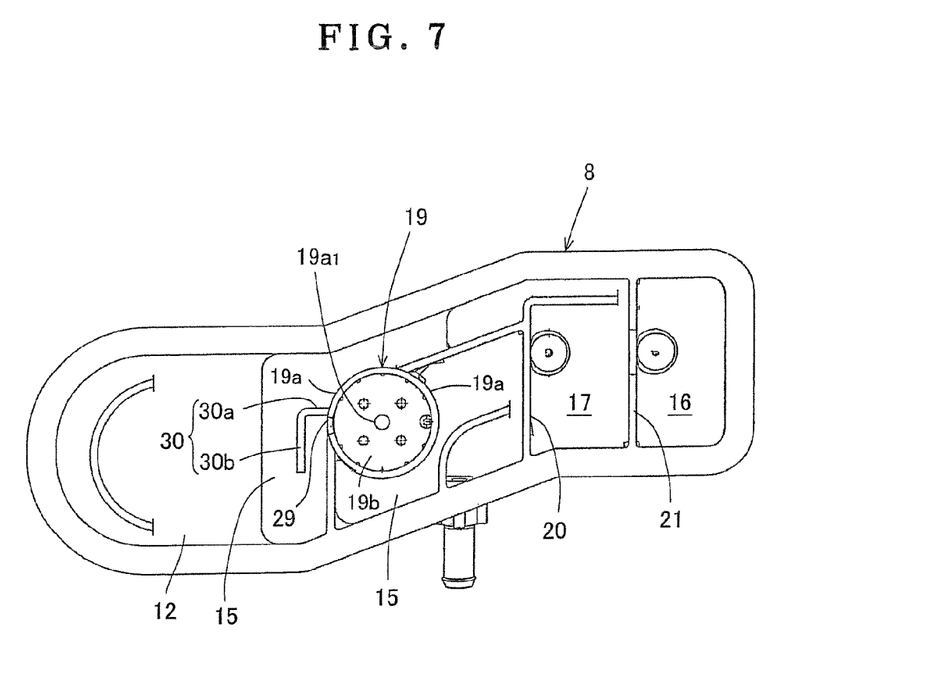
FIG. 7 is a view in which a lower half body of the reservoir tank of the example shown in FIG. 5(a) is seen from above.

Moreover, as shown in FIG. 5(a) and FIG. 7, in the cylindrical dividing wall 19a, there is disposed an interstitial passageway (slit) 29 that allows the fluid volume detection chamber 15 on the outside of this cylindrical dividing wall 19a and the float chamber 19b on the inside of the cylindrical dividing wall 19a to always be communicated with each other. This interstitial passageway (slit) 29 is disposed on the vehicle front side on a straight line or a substantially straight line in the lengthwise direction (vehicle front-rear direction) traveling through the center of the cylindrical dividing wall 19a.

Moreover, the reservoir tank 5 of this example is equipped with a substantially L-shaped plate-like hydraulic fluid interstitial passageway movement deterring portion 30. This hydraulic fluid interstitial passageway movement deterring portion 30 is disposed upright upward from the bottom surface of the fluid volume detection chamber 15 on the outside of the cylindrical dividing wall 19a. In that case, a first side portion 30a of the hydraulic fluid interstitial passageway movement deterring portion 30 is connected to the outer peripheral surface of the cylindrical dividing wall 19a and is disposed extending in the lengthwise direction (vehicle front-rear direction) of the reservoir tank 5 from the outer peripheral surface of the cylindrical dividing wall 19a. Further, a second side portion 30b of the hydraulic fluid interstitial passageway movement deterring portion 30 is disposed extending in a direction orthogonal to or substantially orthogonal to the lengthwise direction of the reservoir tank 5. In the reservoir tank 5 of this example, the second side portion 30b is formed longer than the first side portion 30a, but the lengths of both sides are not limited to this and can be arbitrarily set.

The end of the second side portion 30b of the hydraulic fluid interstitial passageway movement deterring portion 30 on the opposite side of the first side portion 30a is always open in a direction orthogonal to the lengthwise direction of the reservoir tank 5, and the hydraulic fluid interstitial passageway movement deterring portion 30 is always open upward. Further, the second side portion 30b opposes the interstitial passageway 29 of the cylindrical dividing wall 19a in the vehicle front-rear direction. Consequently, the hydraulic fluid interstitial passageway movement deterring portion 30 covers, so as to partially enclose, the interstitial passageway (slit) 29. In that case, in a case where a center $19a_1$ of the cylindrical dividing wall 19a is placed eccentrically from the left-right direction (the vertical direction in FIG. 7) center at this center $19a_1$ position, it is desirable for the first side portion 30a of the hydraulic fluid interstitial passageway movement deterring portion 30 to be disposed on the side where fluctuations in the fluid level of the hydraulic fluid are large at a time when the reservoir tank 5 is tilted in the vehicle left-right direction.

Additionally, the flow of the hydraulic fluid in the float chamber 19b to the outside of the cylindrical dividing wall 19 and movement in the vehicle left-right direction at a time when the reservoir tank 5 is tilted in the vehicle left-right direction is controlled by this hydraulic fluid interstitial passageway movement deterring portion 30. The interstitial passageway (slit) 29 can also be disposed on the vehicle rear side of the cylindrical dividing wall 19a. In that case, the hydraulic fluid interstitial passageway movement deterring portion 30 is disposed on the vehicle rear side of the cylindrical dividing wall 19a so as to cover the interstitial passageway (slit) 29 in the same way as described above.

Moreover, the example described above uses a normally-open switch for the lead switch 19e, but the reservoir tank 5 of this example uses a normally-closed switch.

The other configurations and the other action and effects of the reservoir tank 5 of this example are the same as those in the example described above. Further, the configurations and the action and effects of the brake system using the reservoir tank 5 of this example are the same as those in the example described above.

The present invention is not limited to the examples of the embodiment described above. For example, each example of the embodiment described above can be applied to both a normally-open switch and a normally-closed switch. In short, the present invention is not limited to the examples described above and is capable of various design changes within the scope of matters set forth in the claims.

INDUSTRIAL APPLICABILITY

The reservoir tank pertaining to the present invention can be suitably utilized in a reservoir tank that is used in hydraulic brake systems or hydraulic clutch systems utilizing hydraulic pressure such as oil pressure and stores hydraulic fluid.

Further, the brake system pertaining to the present invention can be suitably utilized in a brake system that uses hydraulic fluid stored in a reservoir tank and applies brakes to wheels.

The invention claimed is:

1. A reservoir tank for use in a vehicle having a vehicle body, a vehicle front side and a vehicle rear side, the reservoir tank being configured to be attached to the vehicle body, and the reservoir tank being formed by welding together an upper half body and a lower half body and which stores hydraulic fluid inside,
the upper half body having at least a tubular neck section which has a hydraulic fluid inlet and a trunk section disposed integrally on the neck section, and
the reservoir tank also comprising a hydraulic fluid movement deterring wall that controls movement of the hydraulic fluid toward the hydraulic fluid inlet at a time when the reservoir tank is tilted, the hydraulic fluid movement deterring wall being molded integrally with the upper half body on an inner peripheral surface of the neck section or on a boundary portion between the inner peripheral surface of the neck section and an inner surface of the trunk section, and
wherein the hydraulic fluid movement deterring wall has a triangular longitudinal section shape, an under surface of the hydraulic fluid movement deterring wall has a gradient inclined and configured to become lower toward the vehicle rear side when the reservoir tank is attached to the vehicle body, and an upper surface of the hydraulic fluid movement deterring wall has a gradient inclined and configured to become higher toward the vehicle rear side when the reservoir tank is attached to the vehicle body.

2. The reservoir tank according to claim 1, wherein the hydraulic fluid movement deterring wall is disposed extending toward a center of the tubular neck section.

3. The reservoir tank according to claim 2, wherein a hydraulic fluid flow area of a transverse section, orthogonal to an axial direction of the neck section, of a portion of the neck section where the hydraulic fluid movement deterring wall is disposed, is set smaller than a hydraulic fluid flow area of a transverse section, orthogonal to the axial direction of the neck section, of a portion of the neck section where the hydraulic fluid movement deterring wall is not disposed.

4. The reservoir tank according to claim 2, wherein the hydraulic fluid movement deterring wall is configured to extend toward the vehicle front side when the reservoir tank is attached to the vehicle body.

5. A brake system comprising at least:
a reservoir tank that stores hydraulic fluid;
a master cylinder to which the hydraulic fluid in the reservoir tank is supplied and which generates brake pressure at a time when the master cylinder is actuated; and
a brake cylinder that is actuated by hydraulic pressure from the master cylinder,
wherein the reservoir tank is the reservoir tank according to claim 2.

6. The reservoir tank according to claim 1, wherein a hydraulic fluid flow area of a transverse section, orthogonal to an axial direction of the neck section, of a portion of the neck section where the hydraulic fluid movement deterring wall is disposed, is set smaller than a hydraulic fluid flow area of a transverse section, orthogonal to the axial direction of the neck section, of a portion of the neck section where the hydraulic fluid movement deterring wall is not disposed.

7. A brake system comprising at least:
a reservoir tank that stores hydraulic fluid;
a master cylinder to which the hydraulic fluid in the reservoir tank is supplied and which generates brake pressure at a time when the master cylinder is actuated; and
a brake cylinder that is actuated by hydraulic pressure from the master cylinder,
wherein the reservoir tank is the reservoir tank according to claim 6.

8. The reservoir tank according to claim 1, wherein the hydraulic fluid movement deterring wall is configured to extend toward the vehicle front side when the reservoir tank is attached to the vehicle body.

9. A brake system comprising at least:
a reservoir tank that stores hydraulic fluid;
a master cylinder to which the hydraulic fluid in the reservoir tank is supplied and which generates brake pressure at a time when the master cylinder is actuated; and
a brake cylinder that is actuated by hydraulic pressure from the master cylinder, wherein the reservoir tank is the reservoir tank according to claim 8.

10. The reservoir tank according to claim 1, further comprising a fluid volume detecting component that detects the fluid volume of the hydraulic fluid inside, wherein the fluid volume detecting component has at least
a dividing wall that demarcates a float chamber inside and has an interstitial passageway that allows the float chamber to communicate with outside the float chamber, and
a float that is disposed in the float chamber which float moves in response to a fluid level of the hydraulic fluid in the float chamber, and
a hydraulic fluid interstitial passageway movement deterring portion that controls movement of the hydraulic fluid through the interstitial passageway is disposed so as to cover the interstitial passageway.

11. A brake system comprising at least:
a reservoir tank that stores hydraulic fluid;
a master cylinder to which the hydraulic fluid in the reservoir tank is supplied and which generates brake pressure at a time when the master cylinder is actuated; and
a brake cylinder that is actuated by hydraulic pressure from the master cylinder, wherein the reservoir tank is the reservoir tank according to claim 1.

* * * * *